United States Patent
Kang et al.

(10) Patent No.: US 10,490,816 B2
(45) Date of Patent: Nov. 26, 2019

(54) POSITIVE ELECTRODE ACTIVE MATERIAL FOR LITHIUM SECONDARY BATTERY, METHOD OF PREPARING THE SAME AND LITHIUM SECONDARY BATTERY INCLUDING THE SAME

(71) Applicant: LG Chem, Ltd., Seoul (KR)

(72) Inventors: Min Suk Kang, Daejeon (KR); Chi Ho Jo, Daejeon (KR); Ji Hoon Ryu, Daejeon (KR); Sun Sik Shin, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 310 days.

(21) Appl. No.: 15/515,447

(22) PCT Filed: Oct. 2, 2015

(86) PCT No.: PCT/KR2015/010449
§ 371 (c)(1),
(2) Date: Mar. 29, 2017

(87) PCT Pub. No.: WO2016/053054
PCT Pub. Date: Apr. 7, 2016

(65) Prior Publication Data
US 2017/0222225 A1   Aug. 3, 2017

(30) Foreign Application Priority Data

Oct. 2, 2014   (KR) .................... 10-2014-0133474
Oct. 1, 2015   (KR) .................... 10-2015-0138717

(51) Int. Cl.
*H01M 4/525*   (2010.01)
*H01M 4/1391*   (2010.01)
(Continued)

(52) U.S. Cl.
CPC ............ *H01M 4/525* (2013.01); *C01G 51/00* (2013.01); *C01G 51/42* (2013.01); *H01M 2/10* (2013.01);
(Continued)

(58) Field of Classification Search
CPC .... H01M 4/525; H01M 4/0471; H01M 4/366; H01M 4/505; H01M 4/1391;
(Continued)

(56) References Cited

U.S. PATENT DOCUMENTS 9,786,903 B2 * 10/2017 Ryu .................. H01M 4/131
9,979,014 B2 *  5/2018 Kim ................. H01M 4/366
(Continued)

FOREIGN PATENT DOCUMENTS

CN    102315443 A    1/2012
EP      2405521 A1   1/2012
(Continued)

OTHER PUBLICATIONS

Machine translation of JP 2003-217586 (no date).*
(Continued)

*Primary Examiner* — Amanda C. Walke
(74) *Attorney, Agent, or Firm* — Lerner, David, Littenberg, Krumholz & Mentlik, LLP

(57) ABSTRACT

The present invention relates to a positive electrode active material for a lithium secondary battery, and a lithium secondary battery including the same, and the positive electrode active material includes lithium cobalt oxide particles. The lithium cobalt oxide particles include lithium cobalt oxide having a Li/Co molar ratio of less than 1 in the particles. Good rate property and life property may be obtained without worrying on the deterioration of initial capacity property.

18 Claims, 3 Drawing Sheets

(51) Int. Cl.
- *C01G 51/00* (2006.01)
- *H01M 4/04* (2006.01)
- *H01M 4/36* (2006.01)
- *H01M 10/0525* (2010.01)
- *H01M 2/10* (2006.01)
- *H01M 4/505* (2010.01)
- *H01M 10/052* (2010.01)
- *H01M 4/02* (2006.01)

(52) U.S. Cl.
CPC ....... *H01M 4/0471* (2013.01); *H01M 4/1391* (2013.01); *H01M 4/366* (2013.01); *H01M 4/505* (2013.01); *H01M 10/052* (2013.01); *H01M 10/0525* (2013.01); *C01P 2002/30* (2013.01); *C01P 2004/80* (2013.01); *C01P 2004/86* (2013.01); *C01P 2006/40* (2013.01); *H01M 2004/028* (2013.01)

(58) Field of Classification Search
CPC ... H01M 10/0525; C01G 51/00; C01G 51/42; C01P 2004/80; C01P 2004/86
USPC ...................................................... 429/231.3
See application file for complete search history.

(56) References Cited

U.S. PATENT DOCUMENTS

| | | | |
|---|---|---|---|
| 2003/0125471 A1 | 7/2003 | Ishihara et al. | |
| 2004/0200998 A1* | 10/2004 | Park | C01G 51/42 252/500 |
| 2006/0135634 A1 | 6/2006 | Guidetti et al. | |
| 2007/0218363 A1 | 9/2007 | Paulsen et al. | |
| 2008/0026292 A1* | 1/2008 | Paulsen | H01M 4/505 429/231.3 |
| 2010/0285366 A1* | 11/2010 | Endoh | H01M 4/13 429/231.95 |
| 2012/0009476 A1 | 1/2012 | Park et al. | |
| 2012/0052257 A1 | 3/2012 | Kyota | |
| 2016/0003026 A1* | 1/2016 | Adams | E21B 47/06 166/250.01 |
| 2016/0211507 A1* | 7/2016 | Sharma | H01M 4/0402 |
| 2016/0268601 A1* | 9/2016 | Paulsen | H01M 4/525 |
| 2016/0329563 A1* | 11/2016 | Oh | H01M 4/505 |
| 2017/0309910 A1* | 10/2017 | Jo | H01M 4/366 |

FOREIGN PATENT DOCUMENTS

| | | | |
|---|---|---|---|
| JP | 58027743 A | 2/1983 | |
| JP | 3134012 A | 6/1991 | |
| JP | H1027613 A | 1/1998 | |
| JP | 200396388 A | 4/2003 | |
| JP | 20030212937 A | 7/2003 | |
| JP | 20030217586 A | 7/2003 | |
| JP | 20050113134 A | 4/2005 | |
| JP | 20060519918 A | 8/2006 | |
| JP | 200777359 A | 3/2007 | |
| JP | 20110256345 A | 12/2011 | |
| JP | 201246675 A | 3/2012 | |
| JP | 2017536649 A | 12/2017 | |
| KR | 20030083476 A | 10/2003 | |
| KR | 20120004340 A | 1/2012 | |
| KR | 20140067508 A | 6/2014 | |
| WO | 2005114768 A1 | 12/2005 | |

OTHER PUBLICATIONS

Gummow et al., Spinel Versus Layered Structures for Lithium Cobalt Oxide Synthesised at 400° C., Materials Research Bulletin, vol. 28, 1993, pp. 235-246 (Received Dec. 22, 1992).
Search Report from Office Action for CN2015800540816 dated Dec. 3, 2018.
A. Van Der Ven et al., Electrochemical properties of spinel LixCoO2: A first-principles investigation, Physical Review B, Jan. 1, 1999-II, pp. 742-749, vol. 59, No. 2.
Gummow, R. J. et al., "Spinel Versus Layered Structures for Lithium Cobalt Oxide Synthesised at 400° C.", Materials Research Bulletin, Mar. 1993, pp. 235-246, vol. 28, No. 3, Pergamon Press Ltd., USA.
International Search Report for Application No. PCT/JP2015/074795 dated Nov. 24, 2015.
S. Choi et al., "Chemical Synthesis and Properties of Spinel Li1-XCo2O4-d", Journal of Solid State Chemistry, Mar. 2002, pp. 332-338, vol. 164, No. 2.
Extended European Search Report for Application No. EP15846750 dated Jun. 14, 2017.

* cited by examiner

POSITIVE ELECTRODE ACTIVE MATERIAL FOR LITHIUM SECONDARY BATTERY, METHOD OF PREPARING THE SAME AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2015/010449, filed Oct. 2, 2015, which claims priority to Korean Patent Application No. 2014-0133474, filed on Oct. 2, 2014, and No. 2015-0138717, filed on Oct. 1, 2015, the entire contents of which are incorporated herein by reference.

TECHNICAL FIELD

The present invention relates to a positive electrode active material for a lithium secondary battery, a method of preparing the same, and a lithium secondary battery including the same.

BACKGROUND ART

As technical developments and demands on mobile devices are increasing, demands on secondary batteries as an energy source is being rapidly increasing. Among the secondary batteries, lithium secondary batteries having high energy density and voltage, long cycle life, and low self-discharge rate are commercialized and widely used.

However, the lithium secondary battery has a limitation that the life thereof decreases rapidly via repeating charge and discharge. Particularly, the limitation is more serious at high temperatures. The reason is that an electrolyte may be decomposed due to moisture in the battery or other factors, an active material may be deteriorated, or the internal resistance of the battery may increase.

A positive electrode active material for a lithium secondary battery, which is being actively researched, developed and used, is $LiCoO_2$ with a layered structure. $LiCoO_2$ may be easily synthesized and has good electrochemical properties including life property, and is the most widely used material. However, $LiCoO_2$ has low structural stability, and the application thereof to a battery with high capacity is limited.

As the substituents of the positive electrode active material, various lithium transition metal oxides such as $LiMnO_2$, $LiMn_2O_4$, $LiFePO_4$, and $Li(Ni_xCo_yMn_z)O_2$, have been developed. $LiNiO_2$ has merits of providing the battery properties of high discharge capacity, however is hardly synthesized by a simple solid phase reaction and has low thermal stability and cycle property. In addition, lithium manganese oxides such as $LiMnO_2$ or $LiMn_2O_4$ have merits of good thermal stability and low cost, however have limitations of a small capacity and inferior properties at high temperatures. Particularly, for $LiMn_2O_4$, some products are commercialized at low cost, however the life property thereof is not good due to Jahn-Teller distortion owing to $Mn^{3+}$. Since $LiFePO_4$ is inexpensive and safe, a lot of research is being conducted for the use in a hybrid electric vehicle (HEV), however the application thereof to another fields is hard due to low conductivity.

Due to such circumstances, a lithium nickel manganese cobalt oxide, $Li(Ni_xCo_yMn_z)O_2$ (where x, y, and z are atomic partial ratios of each independent oxide composite elements and satisfy $0<x\leq1$, $0<y\leq1$, $0<z\leq1$, and $0<x+y+z\leq1$), receives much attention as the substituting positive electrode active material of $LiCoO_2$. This material is cheaper than $LiCoO_2$ and has merits of being used under a high capacity and a high voltage. However, the material has demerits of not providing good rate characteristic and life property at high temperatures. In order to increase the structural stability of the lithium nickel manganese cobalt oxide, the amount of Li relative to the amount of a transition metal included in the oxide is increased.

Recently, as the size of portable devices such as mobile phones and tablet computers is gradually miniaturized, batteries applied thereto are also required to be miniaturized together with high capacity and high energy. In order to increase the energy of a battery per unit volume, the packing density of an active material or a voltage is required to be increased. In order to increase the packing density, active materials having large size particles are preferable. However, the active materials having large size particles have a relatively small surface area, and thus, an active area making contact with an electrolyte may be also narrow. The narrow active area may be kinetically unfavorable, and relatively low rate characteristic and initial capacity may be attained.

DISCLOSURE OF THE INVENTION

Technical Problem

According to first aspect of the present invention, there is provided a positive electrode active material for a lithium secondary battery, which has large-sized particles, however has good rate characteristic and life property without deteriorating initial capacity property.

According to second aspect of the present invention, there are provided a positive electrode, a lithium secondary battery, a battery module, and a battery pack including the positive electrode active material.

Technical Solution

To overcome such above limitations, according to an embodiment of the present invention, there is provided a positive electrode active material for a lithium secondary battery including lithium cobalt oxide particles, in which the lithium cobalt oxide particles include a lithium deficient lithium cobalt oxide having a Li/Co molar ratio of less than 1 in the particles.

According to another embodiment of the present invention, there is provided a method of preparing the positive electrode active material for a lithium secondary battery, including preparing first lithium cobalt oxide particles by mixing a cobalt raw material and a lithium raw material in amounts satisfying the relation of 0<Li/Co molar ratio<1, and first heating, and mixing a cobalt raw material and a lithium raw material in amounts satisfying the relation of $1\leq$Li/Co molar ratio with respect to the first lithium cobalt oxide particles, and second heating.

According to a further another embodiment of the present invention, there is provided a positive electrode for a lithium secondary battery, including the positive electrode active material.

According to a further another embodiment of the present invention, there is provided a lithium secondary battery including the positive electrode.

According to a further another embodiment of the present invention, there is provided a battery module including the lithium secondary battery as a unit cell.

According to a further another embodiment of the present invention, there is provided a battery pack including the battery module.

Particulars of exemplary embodiments of the present invention will be included in the following detailed explanation.

Effects of the Invention

The positive electrode active material for a lithium secondary battery according to the present invention may show good rate characteristic and life property without deteriorating initial capacity property even with large-sized particles by increasing the transport rate of lithium ions in the particle.

BRIEF DESCRIPTION OF THE DRAWINGS

The accompanying drawings in the present disclosure illustrate preferred embodiments of the present invention, and serve to further understanding of the principles of the present invention together with the description. The present invention should not be construed as limited to the description in the drawings.

BEST MODE FOR CARRYING OUT THE INVENTION

Figure 1:
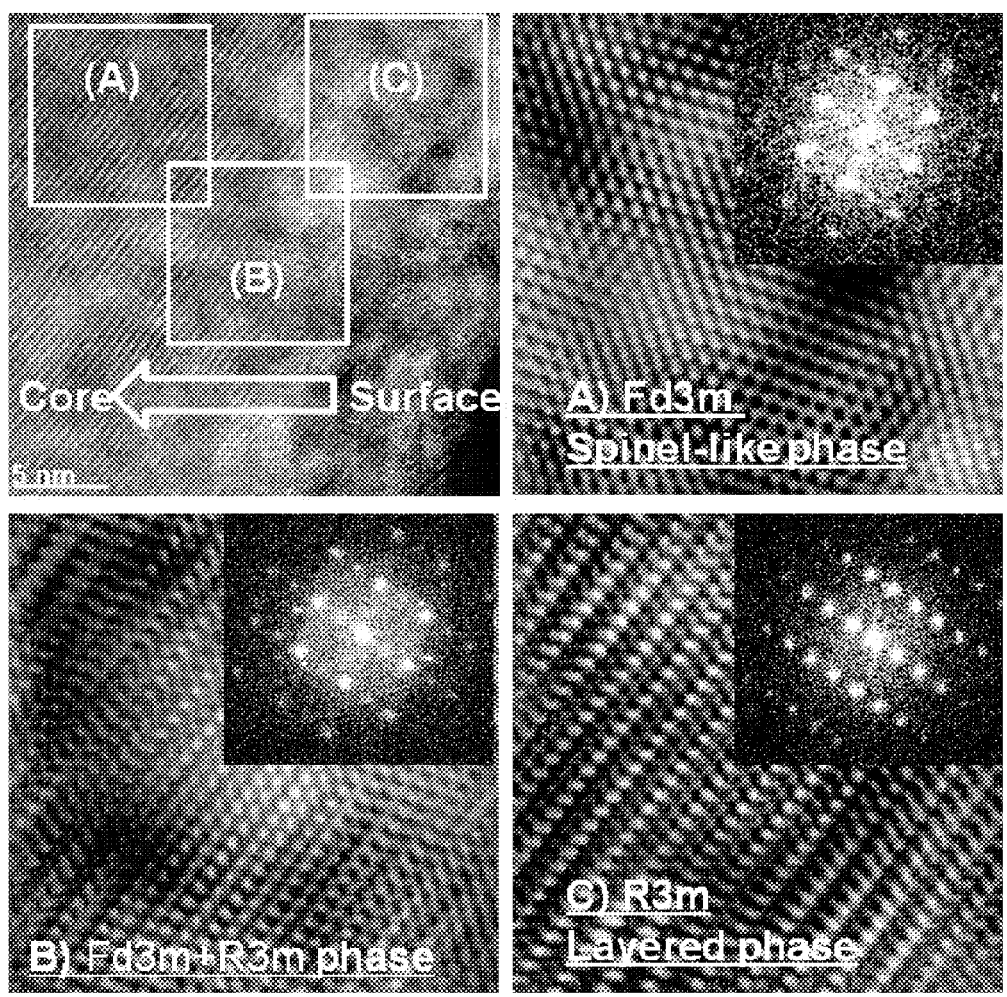
FIG. 1 illustrates photographic images for observing the crystal structure of a positive electrode active material prepared in Preparation Example 1 using a transmission electron microscopy (TEM)

Hereinafter, the present invention will be explained in more detail to assist the understanding of the present invention.

It will be further understood that terms or words used in the description and claims should not be interpreted as having a meaning such as those used in common or defined in dictionaries, however should be interpreted as having a meaning and concept that is consistent with the technical spirit of the present invention on the basis of a principle that an inventor may define the concept of terms appropriately to explain his invention by the best way.

According to the present invention, a lithium deficient structure capable of the three-dimensional transport of lithium ions in active material particles is formed during preparing a lithium cobalt oxide-based positive electrode active material with a primary particle phase, and so, the transport of lithium ions in the particle may be increased, and good capacity and life property may be obtained without deteriorating rate characteristic and initial capacity property even with large-sized particles.

That is, the positive electrode active material for a lithium secondary battery according to an embodiment of the present invention includes lithium cobalt oxide particles, and the lithium cobalt oxide particle includes the lithium deficient lithium cobalt oxide in which a Li/Co molar ratio is less than 1, and more preferably, from 0.95 to less than 1 in the particle.

In the present invention, the "inner part" of the positive electrode active material particles means a region excluding the surface of the active material particle, and particularly means a distance from the center to the surface of the active material particle, that is, a region corresponding to a distance from 0% to less than 100% from the center of the particle with respect to the radius of the active material particle.

Different from common lithium cobalt oxide having a layered crystal structure, the lithium deficient lithium cobalt oxide may have a cubic crystal structure belongs to an Fd-3m space group, and the lattice constant (a0) thereof may be from 7.992 to 7.994 (25° C.). The crystal structure is similar to a spinel crystal structure, and the three-dimensional transport of lithium ions may be possible like in the spinel crystal structure. Accordingly, the transport of the lithium ions may be easy, and the rate may be high when compared to those in a layered structure in which the two-dimensional transport of lithium ions may be possible, and so, the intercalation and deintercalation of the lithium ions may become easier. Generally, the transport of lithium ions in the particles of a positive electrode active material having large-sized particles is not easy. However, the lithium deficient lithium cobalt oxide that has the above-described crystal structure is provided in the particles, and the transport of the lithium ions may be rapid and easy, and the intercalation and deintercalation of lithium ions may be easy, thereby decreasing initial internal resistance of a battery and further improving discharge capacity and life property without worrying on the deterioration of rate characteristic and initial capacity property even with large-sized particles.

The crystal structure of the lithium deficient lithium cobalt oxide may be identified by a common identification method of a crystal structure, and the crystal structure may particularly be identified using a transmission electron microscope.

More particularly, the lithium deficient lithium cobalt oxide may include first lithium cobalt oxide of the following Formula 1.

    [Formula 1]

In Formula 1, a and x are atomic fractions of each independent component element of the oxide and satisfy the following relations of $0<a\leq0.05$, and $0\leq x\leq0.02$.

In Formula 1, M includes at least one element selected from the group consisting of W, Mo, Zr, Ti, Mg, Ta, Al, Fe, V, Cr, Ba, Ca, and Nb as a doping element, and may be included in the first lithium cobalt oxide in an amount such that x satisfies the relation of $0\leq x\leq0.02$. As described above, in the case where the metal element is further doped into the lithium deficient lithium cobalt oxide, structural stability may be improved, and there would be no more concern on the deterioration of the structural stability of the positive electrode active material due to lithium deficiency. In addition, the output property of a battery may be improved, and by doping the above-described amount, the improving effect thereof may be further improved.

More particularly, in the positive electrode active material according to an embodiment of the present invention, the lithium cobalt oxide particles may have a core-shell structure. In this case, a core part may include the lithium deficient first lithium cobalt oxide of the following Formula 1, and a shell part may include the lithium cobalt oxide of the following Formula 2.

    [Formula 1]

$Li_bCoM'_yO_2$ [Formula 2]

(In Formula 1 and 2, M and M' each independently includes at least one metal element selected from the group consisting of W, Mo, Zr, Ti, Mg, Ta, Al, Fe, V, Cr, Ba, Ca, and Nb, and a, b, x, and y are the atomic fractions of the each independent component elements of the oxide and satisfy the following relations of $0<a\leq0.05$, $1\leq b\leq1.2$, $0\leq x\leq0.02$, and $0\leq y\leq0.02$.)

In Formula 1, the two relations of $0<a\leq0.05$, and $1\leq b\leq1.2$ are satisfied at the same time, the improving effect of rate characteristic according to the formation of a lithium deficient structure may be further improved by 10% or more when compared to an active material with a greater than 0.05 and with b greater than 1.2. The improving effect of the rate characteristic may be the improved to the maximum of 30% when compared to lithium cobalt oxide ($LiCoO_2$) without forming a lithium deficient structure.

In the lithium cobalt oxide particles, the first lithium cobalt oxide may have the spinel-like structure as described above, that is, may belongs to an Fd-3m space group, have a cubic crystal structure, and the second lithium cobalt oxide may have a layered structure.

As described above, concerning the transport of the lithium ions, the positive electrode active material according to an embodiment of the present invention includes lithium cobalt oxide of a deficient structure allowing the three-dimensional transport of lithium ions in mechanically unfavorable inner part of the active material particle, that is, in the core part, and the above-described effects may be obtained. In addition, by including lithium rich lithium cobalt oxide having a Li/Co ratio of 1 or more in mechanically favorable surface side of the active material particle, that is, in the shell part, the structural stability of the active material, particularly, the structural stability thereof at high temperatures may be improved, and capacity deterioration at high temperatures may be prevented. In addition, the reactivity with an electrolyte may decrease, and the gas generation may be decreased. Further, in the case where a certain state of charge (SOC) is supposed during charging, mechanically favorable surface may have higher SOC, however the inner part may have lower SOC.

In consideration of the control of the Li/Co ratio according to the position of the active material particle and the remarkable improving effect therefrom, the two relations of $0.01<a\leq0.05$, and $1\leq b\leq1.05$ may be satisfied in Formula 1 and 2.

More particularly, in the positive electrode active material having the core-shell structure, the core part and the shell part may include lithium distributed with a gradually decreasing concentration gradient toward the center of the active material particle in each region.

In this case, the lithium concentration gradient slope in the core part and the shell part may be a linear equation which is change according to the thickness of the particle from the center of the active material particle, or may be a quadric equation. In addition, the lithium concentration gradient slope in the core part and the lithium concentration gradient slope in the shell part may have the same or different slope values.

Meanwhile, in the positive electrode active material having the core-shell structure, each of the core part and the shell part may include the lithium present with one concentration value in each region. In this case, the lithium concentration in the core part may be lower than the lithium concentration in the shell part.

In addition, in the case where the core part and the shell part each independently has different lithium concentration distribution, height difference according to the difference of the lithium concentration in the core part and the shell part may be formed at the contacting interface of the core part and the shell part.

Meanwhile, the positive electrode active material having the core-shell structure may include lithium distributed with a gradually decreasing concentration gradient from the surface to the center of the particle over the whole active material particles. In this case, in Formula 1 and 2, a may increase toward the center of the particle within a range of $0<a\leq0.05$, and b may decrease toward the center of the particle within a range of $1\leq b\leq1.2$. In addition, the lithium concentration gradient slope may be a linear equation which is change according to the thickness of the particle from the center of the active material particle, or may be a quadric equation. With the concentration gradient over the whole particles, a rapid phase boundary region is not present from the center to the surface, thereby stabilizing a crystal structure and increasing thermal stability. In addition, if the concentration gradient slope of a metal is constant, the improving effect of structural stability may be increased further.

In the present invention, the concentration change of the lithium in the surface and the inner part of the active material or the lithium cobalt oxide particle may be measured by a common method, and the concentration of the lithium and other elements present in the surface may be measure by an X-ray photoelectron spectroscopy (XPS), a transmission electron microscopy (TEM), or an energy dispersive x-ray spectroscopy (EDS). The lithium component in the lithium cobalt oxide may be measured using an inductively coupled plasma-atomic emission spectrometer (ICP-AES), and the shape of the lithium cobalt oxide may be identified using a time of flight secondary ion mass spectrometry (ToF-SIMS).

In the present invention, the core part of the active material particle is a distance from the center to the surface of the lithium cobalt oxide particle, that is, a region corresponding to a distance from 0% to 99%, and more particularly, from 0% to 95% from the center of the particle relative to the radius of the active material, and the shell part is present on the surface of the core part and means a region excluding the core part in the active material particle.

Particularly, in the positive electrode active material according to an embodiment of the present invention, the radius of the core part and the thickness of the shell part may have a ratio from 1:0.01 to 1:0.1. In the case where the radius of the core part deviates the upper limit and is excessively large, the structural stabilization effect of the active material according to the formation of the shell part including the lithium rich lithium cobalt oxide and the resultant improving effect of battery properties may be trivial, and in the case where the thickness of the shell part deviates the upper limit and is excessively large, the core part may be relatively decreased, and the rate increase of lithium ions in the active material particle and the resultant improving effect may be trivial. More particularly, under the conditions of the radius of the core part and the thickness ratio of the shell part, the thickness of the shell part may be from 1 to 500 nm, or from 10 to 300 nm.

The positive electrode active material according to an embodiment of the present invention includes a monolith structure formed from the primary particles of the lithium cobalt oxide.

In the present invention, a "monolith structure" means a structure present in an independent phase in which particles have a morphologically and are not agglomerated each other. A particle structure in contrast to the monolith structure may include a structure forming a relatively large-sized particle shape (secondary particles) via physical and/or chemical agglomeration of relatively small-sized particles (primary particles).

Generally, the size of the particles of the positive electrode active material is preferably large for attaining a high capacity of a battery, however in this case, the surface area is relatively small, and the active area making a contact with an electrolyte decreases, thereby deteriorating rate characteristic and an initial capacity. In order to solve the defects, a positive electrode active material of a secondary particle phase obtained by assembling the primary particles of fine particles is mainly used. However, in the positive electrode active material with the granulated secondary particles, lithium ions may react with moisture or $CO_2$ in the air to easily form surface impurities such as $Li_2CO_3$, and LiOH while moving toward the surface of the active material, and the surface impurities thus formed may reduce the capacity of a battery or may be decomposed and generate gas in the battery, thereby generating the swelling of the battery. Therefore, the stability at high temperatures may become serious. However, the positive electrode active material according to an embodiment of the present invention includes the monolith structure, and there would be no worries on the generation of the defects of the positive electrode active material having the secondary particle phase.

The positive electrode active material having the monolith structure may have an average particle diameter ($D_{50}$) from 3 μm to 50 μm in consideration of the specific surface area and the density of a positive electrode mixture and may have a greater average particle diameter ($D_{50}$) from 10 μm to 50 μm due to the structural characteristic enabling the easy intercalation and deintercalation of lithium ions when compared to a common positive electrode active material.

In the present invention, the average particle diameter ($D_{50}$) of the positive electrode active material may be defined by the particle diameter on the basis of 50% of particle diameter distribution. The average particle diameter ($D_{50}$) of the positive electrode active material particles according to an embodiment of the present invention may be measured using, for example, a laser diffraction method. Particularly, the average particle diameter ($D_{50}$) of the positive electrode active material may be measured by dispersing the positive electrode active material particles in a dispersion medium, introducing thereof to a commercially available laser diffraction particle size measuring apparatus (for example, Microtrac MT 3000), irradiating ultrasonic waves of about 28 kHz with the output of 60 W, and computing the average particle diameter ($D_{50}$) on the basis of 50% of the particle diameter distribution in the measuring apparatus.

The positive electrode active material according to an embodiment of the present invention may be prepared by a method including a step of preparing the first lithium cobalt oxide particles by mixing a cobalt raw material and a lithium raw material in amounts satisfying the relation of 0≤Li/Co molar ratio<1, and first heating (Step 1), and a step of mixing a cobalt raw material and a lithium raw material in amounts satisfying the relation of 1≤Li/Co molar ratio with respect to the first lithium cobalt oxide particles, and second heating (Step 2). According to another embodiment of the present invention, a method of preparing the positive electrode active material for a lithium secondary battery is provided.

Hereinafter, each step will be described in detail, and Step 1 is a step for preparing the first lithium cobalt oxide particles having a lithium deficient structure.

Particularly, the first lithium cobalt oxide particles having the lithium deficient structure may be prepared by mixing the cobalt raw material and the lithium raw material in amounts satisfying the relation of 0≤Li/Co molar ratio<1, and first heating.

The cobalt raw material may particularly be a cobalt-containing oxide, hydroxide, oxyhydroxide, halogenide, nitrate, carbonate, acetate, oxalate, citrate, or sulfate, and may more particularly be $Co(OH)_2$, CoO, CoOOH, $Co(OCOCH_3)_2 \cdot 4H_2O$, $Co(NO_3)_2 \cdot 6H_2O$, or $Co(SO_4)_2 \cdot 7H_2O$, or may be a mixture of two or more thereof.

The lithium raw material may particularly be a lithium-containing oxide, hydroxide, oxyhydroxide, halogenide, nitrate, carbonate, acetate, oxalate, citrate, or sulfate, and may more particularly be $Li_2CO_3$, $LiNO_3$, $LiNO_2$, LiOH, $LiOH \cdot H_2O$, LiH, LiF, LiCl, LiBr, LiI, $Li_2O$, $Li2SO_4$, $CH_3COOLi$, or $Li3C_6H_5O_7$, or may be a mixture two or more thereof.

The cobalt raw material and the lithium raw material may be mixed in amounts such that a Li/Co molar ratio satisfies the relation of 0<Li/Co molar ratio<1, or 0.95≤Li/Co molar ratio<1. With the mixing amount range, a core part including the first lithium cobalt oxide of a lithium deficient structure, particularly, the first lithium cobalt oxide of Formula 1 may be formed.

In addition, in the case where the first lithium cobalt oxide thus prepared is doped, the raw material of a metal element (M) for doping may be selectively added further during mixing the cobalt raw material and the lithium raw material.

The raw material of the metal element (M) for doping may particularly be at least one metal selected from the group consisting of W, Mo, Zr, Ti, Mg, Ta, Al, Fe, V, Cr, Ba, Ca, and Nb, or an oxide, a hydroxide, an oxyhydroxide, a halogenide, a nitrate, a carbonate, an acetate, an oxalate, a citrate, or a sulfate including thereof, or a mixture of two or more thereof may be used.

The first heating of the mixture of the raw materials may be conducted at a temperature from 800° C. to 1,100° C. If the first heating temperature is less than 800° C., an unreacted raw material may remain, and discharge capacity per unit weight may be decreased, and cycle property and an operation voltage may be deteriorated. If the heating temperature is more than 1,100° C., by-products may be produced, and discharge capacity per unit weight may be decreased, and cycle property and an operation voltage may be deteriorated.

The first heating may preferably be conducted at temperatures lower than temperatures for the following second heating and within the above-described temperature range so as to control the diffusion rate of lithium and to form the lithium cobalt oxide of the deficient structure.

In addition, the first heating may be conducted in the air or under an oxygen atmosphere for 5 to 30 hours for sufficient diffusion reaction between particles of the mixture.

Meanwhile, Step 2 is a step for preparing a second lithium cobalt oxide layer without a lithium deficient structure in the surface of the first lithium cobalt oxide particles having the lithium deficient structure prepared in Step 1.

Particularly, the lithium cobalt oxide layer without a lithium deficient structure may be prepared by mixing a cobalt raw material and a lithium raw material in amounts satisfying the relation of 1≤Li/Co molar ratio, or 1≤Li/Co molar ratio≤1.2 with respect to the first lithium cobalt oxide particle having the lithium deficient structure prepared in Step 1, and second heating.

In addition, in Step 2, the manufacture of the lithium cobalt oxide layer may be conducted by the same method as in Step 1 except for mixing the cobalt raw material and the lithium raw material in amounts such that a Li/Co molar ratio satisfies the relation of 1≤Li/Co molar ratio, preferably, 1≤Li/Co molar ratio≤1.2 with respect to the lithium cobalt oxide particle having the lithium deficient structure prepared in Step 1. If the cobalt raw material and the lithium raw material are mixed with the amounts within the amount range, a layer including lithium cobalt oxide without a lithium deficient structure, particularly, the lithium cobalt oxide of Formula 2 or lithium cobalt oxide having a layered structure may be formed. In this case, the cobalt raw material and the lithium raw material may be the same as those described in Step 1.

In addition, in the case where the second lithium cobalt oxide thus prepared is doped, the raw material of a metal element (M') for doping may be selectively added further during mixing the cobalt raw material and the lithium raw material.

The raw material of the metal element (M') for doping may particularly be at least one metal selected from the group consisting of W, Mo, Zr, Ti, Mg, Ta, Al, Fe, V, Cr, Ba, Ca, and Nb, or an oxide, a hydroxide, an oxyhydroxide, a halogenide, a nitrate, a carbonate, an acetate, an oxalate, a citrate, or a sulfate including thereof, or a mixture of two or more thereof may be used.

Meanwhile, the second heating in Step 2 may be conducted at a temperature from 800° C. to 1,100° C. If the heating temperature is less than 800° C., the crystallization of lithium cobalt oxide formed in the surface may be insufficiently proceed, and the transport of lithium ions may be inhibited. If the heating temperature is more than 1,100° C., the crystallization may be excessively proceed, or an unstable structure may be formed due to the evaporation of Li in a crystal structure. The second heating in Step 2 may preferably be conducted at a temperature from 1,000° C. to 1,100° C. to prevent the deterioration of discharge capacity per unit weight and the deterioration of cycle property and an operation voltage, due to a remaining unreacted raw material, the production of by-products, and the non-crystallization or over-crystallization of the lithium cobalt oxide thus produced.

Since the transport and the diffusion of the lithium in the positive electrode active material may be promoted with the increase of the second heating temperature, the distribution of the lithium in the positive electrode active material may be controlled according to the second heating temperature. Particularly, in the case where the second heating temperature within the temperature range is 1,000° C. or more, or from 1,000° C. to 1,100° C., the lithium may be distributed with concentration gradient in the active material.

In addition, the second heating may be conducted in the air or under an oxygen atmosphere for 7 to 50 hours. If the heating time is excessively long, the evaporation of the lithium and the crystallinity of the metal oxide layer formed on the surface may increase, thereby inducing limitations on the transport of the lithium ions.

The preparation method of the positive electrode active material according to an embodiment of the present invention is a dry method not using a solvent.

In a wet method using a solvent for preparing a positive electrode active material and for surface treating, a metal precursor is used after dissolving in a solvent, and the pH change of the solvent may be easy, and the size of the positive electrode active material finally prepared may be easily changed, or particle cleavage may be induced. In addition, lithium ions may be eluted from the surface of the positive electrode active material including lithium, and various oxides may be formed as by-products at the surface. On the contrary, the positive electrode active material may be prepared by the dry method in the present invention, the defects due to the use of the solvent may not be generated, and the preparation efficiency and the process availability of the active material may be good. In addition, the dry method does not use a binder, and by-products due to the use of the binder may not be generated.

Since the positive electrode active material prepared by the above-described preparation method includes lithium cobalt oxide having a lithium deficient structure by which the intercalation and the deintercalation of lithium in the particle may be easy, good high voltage property may be obtained without worrying on the deterioration of rate characteristic and initial capacity property even with large-sized particles.

According to another embodiment of the present invention, a positive electrode and a lithium secondary battery including the positive electrode active material are provided.

Particularly, the positive electrode may include a positive electrode current collector, and a positive electrode active material layer formed on the positive electrode current collector and including the positive electrode active material.

The positive electrode current collector may use any material that may not induce the chemical change of a battery and have conductivity, without specific limitation, and may include, for example, stainless steel, aluminum, nickel, titanium, baked carbon, or a surface treated material of surface of aluminum or stainless steel with carbon, nickel, titanium, silver, etc. Generally, the positive electrode current collector may have a thickness from 3 to 500 μm, and the adhesiveness of the positive electrode active material may be increased by forming fine convexo-concave on the surface of the current collector. For example, various shapes including a film, a sheet, a foil, a net, a porous body, a foamed body, a non-woven fabric body, etc. may be used.

Meanwhile, the positive electrode active material layer may include a conductive material and a binder together with the positive electrode active material. In this case, the positive electrode active material may be the same as those described above.

The conductive material is used to impart an electrode with conductivity, and any material that may not induce chemical change in a battery and have electron conductivity may be used, without specific limitation. Particular example may include graphite such as natural graphite and artificial graphite; a carbon-based material such as carbon black, acetylene black, ketchen black, channel black, furnace black, lamp black, thermal black, and carbon fibers; a metal powder or a metal fiber of copper, nickel, aluminum, silver, or the like; conductive whisker such as zinc oxide, and potassium titanate; a conductive metal oxide such as titanium oxide; or a conductive polymer such as polyphenylene derivatives, and the material may be used alone or as a mixture of two or more. Generally, the conductive material may be included in an amount ratio from 1 to 30 wt % relative to the total weight amount of the positive electrode active material layer.

The binder plays the role of improving adhesiveness between the positive electrode active material particles, and between the positive electrode active material and the current collector. Particularly, polyvinylidene fluoride (PVDF), vinylidenefluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, a styrene butadiene rubber (SBR), a fluorine rubber, or diverse copolymers thereof may be used, and the material may be used alone or as a mixture of two or more. The binder may be included in an amount ratio from 1 to 30 wt % relative to the total weight amount of the positive electrode active material layer.

The positive electrode having the above-described structure may be manufactured by a common method of manufacturing a positive electrode except for using the positive electrode active material. Particularly, a composition for forming a positive electrode active material layer obtained by dissolving and dispersing the positive electrode active material, the binder, and the conductive material in a solvent may be applied on the positive electrode current collector, dried, and rolled to manufacture the positive electrode active material layer. In this case, the kind and the amount of the positive electrode active material, the binder, and the conductive material are the same as those described above.

In addition, the solvent in the composition for forming the positive electrode active material layer may be a commonly used solvent in the art and may be dimethyl sulfoxide (DMSO), isopropyl alcohol, N-methylpyrrolidone (NMP), acetone, or water, and the solvent may be used alone or as a mixture of two or more. The amount used of the solvent may be sufficient if the composition has a viscosity capable of forming good thickness uniformity during applying for manufacturing a positive electrode after dissolving or dispersing the positive electrode active material, the conductive material, and the binder therein, in consideration of the applying thickness of a slurry and a production yield.

According to another method, the positive electrode may be manufactured by laminating a film obtained by casting the composition of the positive electrode active material on a separate support and separating from the support, on the positive electrode current collector.

According to a further another embodiment, an electrochemical device including the positive electrode is provided. The electrochemical device may particularly be a battery or a capacitor, and may more particularly be a lithium secondary battery.

The lithium secondary batter may include a positive electrode, a negative electrode facing the positive electrode, a separator disposed between the positive electrode and the negative electrode, and an electrolyte. The positive electrode is the same as described above. In addition, the lithium secondary battery may further and selectively include a battery vessel receiving an electrode assembly of the positive electrode, the negative electrode, and the separator, and a sealing member for sealing the battery vessel.

In the lithium secondary battery, the negative electrode may include a negative electrode current collector, and a negative electrode active material layer disposed on the negative electrode current collector.

The negative electrode current collector may be any material that may not induce the chemical change of a battery and have conductivity, without specific limitation, and may include, for example, copper, stainless steel, aluminum, nickel, titanium, baked carbon, a surface treated material of copper or stainless steel with carbon, nickel, titanium, silver, or the like, or an alloy of aluminum-cadmium. Generally, the negative electrode current collector may have a thickness from 3 to 500 μm, and the adhesiveness of the negative electrode active material may be reinforced by forming fine convexo-concave on the surface of the current collector as in the positive electrode current collector. For example, various shapes including a film, a sheet, a foil, a net, a porous body, a foamed body, a non-woven fabric body, etc. may be used.

The negative electrode active material layer may selectively include a binder and a conductive material together with the negative electrode active material. The negative electrode active material layer may be manufactured by, for example, applying a composition for forming a negative electrode including a negative electrode active material, and selectively a binder and a conductive material on a negative electrode current collector, and drying, or may be manufactured by laminating a film obtained by casting the composition for forming the negative electrode on a separate support and separating from the support, on the negative electrode current collector.

The negative electrode active material may be a compound capable of performing reversible intercalation and deintercalation of lithium. Particular examples may include a carbon material such as artificial graphite, natural graphite, graphitized carbon fiber, and amorphous carbon; a metallic compound capable of forming an alloy with lithium such as Si, Al, Sn, Pb, Zn, Bi, In, Mg, Ga, Cd, an Si alloy, an Sn alloy, and an Al alloy; a metal oxide capable of doping and dedoping lithium such as $SiO_x$ (0<x<2), $SnO_2$, vanadium oxide, and lithium vanadium oxide; a composite including the metallic compound and the carbon material such as an Si—C composite or an Sn—C composite, and a mixture of two or more thereof may be used. In addition, a metal lithium thin film may be used as the negative electrode active material. As the carbon material, both carbon with low crystallinity and carbon with high crystallinity may be used. The carbon with low crystallinity may typically include soft carbon and hard carbon, and the carbon with high crystallinity may typically include amorphous, platy, scaly, spherical or fibrous natural graphite or artificial graphite, and baked carbon at high temperatures such as kish graphite, pyrolytic carbon, mesophase pitch based carbon fiber, meso-carbon microbeads, mesophase pitches, and petroleum or coal tar pitch derived cokes.

The binder and the conductive material may be the same as those illustrated in the description of the positive electrode.

Meanwhile, the separator in the lithium secondary battery separates a negative electrode and a positive electrode and provides a transport passage of lithium ions. The separator may be any one used in a common lithium secondary battery, without specific limitation, and particularly, a separator having low resistance to the ion transport in an electrolyte and good impregnation capacity of the electrolyte may be preferable. Particularly, a porous polymer film, for example, a porous polymer film prepared using a polyolefin-based polymer such as an ethylene homopolymer, a propylene homopolymer, an ethylene/butene copolymer, an ethylene/hexene copolymer, and an ethylene/methacrylate copolymer, or a layered structure of two or more thereof may be used. In addition, a commonly used porous non-woven fabric, for example, a non-woven fabric formed using a glass fiber having a high melting point, a polyethylene terephthalate fiber, etc. may be used. Further, a coated separator including a ceramic component or a polymer material may be used for securing heat resistance or mechanical strength, and a single layer structure or a multilayer structure may be selectively used.

As the electrolyte used in the present invention, an organic liquid electrolyte, an inorganic liquid electrolyte, a solid polymer electrolyte, a gel type polymer electrolyte, a solid inorganic electrolyte, a melting inorganic electrolyte, etc. may be used, without limitation.

Particularly, the electrolyte may include an organic solvent and a lithium salt.

As the organic solvent, any solvent that may play the role of a medium for transporting ions participating in the electrochemical reaction of a battery may be used, without specific limitation. Particularly, the organic solvent may include an ester solvent such as methyl acetate, ethyl acetate, γ-butyrolactone, and ε-caprolactone; an ether-based solvent such as dibutyl ether, and tetrahydrofuran; a ketone-based solvent such as cyclohexanone; an aromatic hydrocarbon-based solvent such as benzene, fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), and propylene carbonate (PC); an alcohol-based solvent such as ethyl alcohol, and isopropyl alcohol; nitriles such as R—CN (where R is C2-C20 linear, branched or cyclic hydrocarbon group and may include a double bond aromatic ring or an ether bond); amides such as dimethyl formamide; dioxolanes such as 1,3-dioxolane; or sulfolanes. Among the solvents, the carbonate solvent is preferable, and a mixture of a cyclic carbonate having high ion conductivity and high dielectricity (for example, ethylene carbonate or propylene carbonate) and a linear carbonate compound having a low viscosity (for example, ethyl methyl carbonate, dimethyl carbonate, or diethyl carbonate) is more preferable. In this case, the cyclic carbonate and a linear carbonate may be mixed in a volume ratio from about 1:1 to about 1:9 for attaining good electrolyte performance.

The lithium salt may be any compound capable of providing lithium ions used in a lithium secondary battery, without specific limitation. Particularly, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt may be within a range from 0.1 to 2.0 M. If the concentration of the lithium salt is in the range, an electrolyte may have an appropriate conductivity and viscosity, thereby providing good electrolyte performance and effective transport of lithium ions.

In the electrolyte, at least one additive such as a haloalkylene carbonate-based compound such as difluoroethylene carbonate, pyridine, triethyl phosphite, triethanolamine, cycle ether, ethylenediamine, n-glyme, hexaphosphoric acid triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxyethanol, and trichloroaluminum other than the components of the electrolyte in order to improve the life property of a battery, to restrain the capacity decrease of a battery, to improve the discharge capacity of a battery, etc. The additive may be included in an amount ratio from 0.1 to 5 wt % relative to the total weight amount of the electrolyte.

A lithium secondary battery including the positive electrode active material according to the present invention has good discharge capacity and output property, and stable capacity maintenance rate, and may be usefully used in a portable device such as a cellular phone, a laptop computer, and a digital camera, and an electric vehicle field including a hybrid electric vehicle (HEV), etc.

According to another embodiment of the present invention, there are provided a battery module including the lithium secondary battery as a unit cell and a battery pack including the battery module.

The battery module or the battery pack may be used as a power source of at least one medium and large size device of power tools; electric vehicles such as an electric vehicle (EV), a hybrid electric vehicle, and a plug-in hybrid electric vehicle (PHEV); or an energy storage system.

Hereinafter, the present invention will be explained in more detail referring to the following examples. However, the examples may include various different modifications, and the scope of the present invention is not limited thereto.

Preparation Example 1: Preparation of Positive Electrode Active Material

A $Li_2CO_3$ powder and a $Co_3O_4$ powder were mixed in certain amounts such that a Li/Co molar ratio was 0.95, followed by first heating at 900° C. for 10 hours. The powder thus obtained was ground and screened to prepare lithium deficient first lithium cobalt oxide particles.

The first lithium cobalt oxide particles thus prepared was dry mixed with a $Li_2CO_3$ powder and a $Co_3O_4$ powder in certain amounts such that a Li/Co molar ratio was 1.01, followed by second heating at 1,050° C. for 20 hours to prepare a positive electrode active material (Average particle diameter: 12 μm) with a monolith structure, in which lithium was distributed with an increasing concentration gradient from the center to the surface of a particle over the whole positive electrode active material.

Preparation Example 2: Preparation of Positive Electrode Active Material

A $Li_2CO_3$ powder and a $Co_3O_4$ powder were mixed in certain amounts such that a Li/Co molar ratio was 0.95, followed by first heating at 900° C. for 10 hours. The powder thus obtained was ground and screened to prepare lithium deficient first lithium cobalt oxide particles.

The first lithium cobalt oxide particles thus prepared was dry mixed with a $Li_2CO_3$ powder and a $Co_3O_4$ powder in certain amounts such that a Li/Co molar ratio was 1, followed by second heating at 900° C. for 20 hours to prepare a positive electrode active material (Average particle diameter: 12 μm) with a monolith structure including second lithium cobalt oxide ($Li_bCoO_2$, b=1) on the surface of the core particle of the first lithium cobalt oxide ($Li_{1-a}CoO_2$, a=0.95). In this case, thickness of the shell part including the second lithium cobalt oxide was 250 nm.

Preparation Example 3: Preparation of Positive Electrode Active Material

A $Li_2CO_3$ powder and a $Co_3O_4$ powder were mixed in certain amounts such that a Li/Co molar ratio was 0.95, followed by first heating at 900° C. for 10 hours. The powder thus obtained was ground and screened to prepare lithium deficient first lithium cobalt oxide particles.

The first lithium cobalt oxide particles thus prepared was dry mixed with a $Li_2CO_3$ powder and a $Co_3O_4$ powder in certain amounts such that a Li/Co molar ratio was 1, and MgO and $TiO_2$ powders were additionally added in certain amounts such that each of Mg and Ti metals is 0.01 mol with respect to 1 mol of Li, followed by second heating at 1,050° C. for 20 hours to prepare a positive electrode active material (Average particle diameter: 12 μm) with a monolith structure, in which lithium is distributed with a concentration gradient gradually increasing from the center to the surface of a particle over the whole positive electrode active material and including lithium cobalt oxide doped with Mg and Ti in a shell part.

Examples 1 to 3: Manufacture of Lithium Secondary Batteries

Lithium secondary batteries were manufactured using each positive electrode active material prepared in Preparation Examples 1 to 3.

In detail, each positive electrode active material prepared in Preparation Examples 1 to 3, a carbon black conductive material, and a PVdF binder were mixed in an N-methyl pyrrolidone solvent in a weight ratio of 90:5:5 to prepare a composition (Viscosity: 5,000 mPa·s) for forming a positive electrode. The composition was applied on an aluminum current collector, dried, and rolled to manufacture a positive electrode.

Mesocarbon microbead (MCMB) which is artificial graphite as a negative electrode active material, a carbon black conductive material, and a PVdF binder were mixed in an N-methyl pyrrolidone solvent in a weight ratio of 85:10:5 to prepare a composition for forming a negative electrode. The composition was applied on a copper current collector to manufacture a negative electrode.

An electrode assembly was manufactured by disposing a porous polyethylene separator between the positive electrode and the negative electrode, and the electrode assembly was positioned in a case. An electrolyte was injected into the case to manufacture a lithium secondary battery. In this case, the electrolyte was prepared by dissolving 1.15 M of lithium hexafluorophosphate ($LiPF_6$) in an organic solvent including ethylene carbonate (EC)/dimethyl carbonate (DMC)/ethyl methyl carbonate (EMC) (Volume ratio of EC/DMC/EMC=3/4/3).

Comparative Example 1: Manufacture of Lithium Secondary Battery

A lithium secondary battery was manufactured by conducting the same procedure described in Example 1 except for using $LiCoO_2$ (Average particle diameter: 12 μm) as the positive electrode active material.

Experimental Example 1

For the positive electrode active material prepared in Preparation Example 1, the molar ratio change of Li/Co was observed according to a depth profile from the surface to the inner part of an active material using an X-ray photoelectron spectroscopy (XPS). The results are shown in the following Table 1.

TABLE 1

| | Depth from the surface of positive electrode active material particle (nm) | Li/Co molar ratio |
|---|---|---|
| Shell part | 50 | 1.01 |
| | 250 | 1.00 |
| | 300 | 1.00 |
| Core part | 500 | 0.99 |
| | 1,000 | 0.99 |
| | 1,500 | 0.99 |

TABLE 1-continued

| Depth from the surface of positive electrode active material particle (nm) | Li/Co molar ratio |
|---|---|
| 2,000 | 0.99 |
| 2,500 | 0.99 |
| 3,000 | 0.99 |
| 3,500 | 0.98 |
| 4,000 | 0.98 |
| 4,500 | 0.98 |
| 5,000 | 0.98 |
| 5,500 | 0.96 |
| 6000 (particle center) | 0.95 |

As shown in Table 1, the positive electrode active material prepared according to Preparation Example 1 had a core-shell structure, in which a shell part including lithium cobalt oxide having a Li/Co ratio of 1 or more was formed in a region corresponding to 300 nm depth from the surface of the particle, and a core part including lithium deficient lithium cobalt oxide having a Li/Co ratio of less than 1 was formed in the particle other than the shell part. Also, it would be secured that the region of the core part in the active material was a region corresponding to a distance of 95% of the radius of the active material particle. In addition, the positive electrode active material formed a gradually decreasing concentration gradient of a Li/Co molar ratio from the surface to the center of the particle. In addition, the concentration gradient slope of lithium in the shell part was greater than the concentration gradient slope of lithium in the core part.

Experimental Example 2

The crystal structure of the positive electrode active material prepared in Preparation Example 1 was observed at the each of surface side and the inner part of the active material using a transmission electron microscope. The results are shown in FIG. 1.

As shown in FIG. 1, the lithium cobalt oxide present at the inner part of the active material particle was identified to have a cubic crystal structure of an Fd-3m space group (A) like a spinel crystal structure. Meanwhile, the lithium cobalt oxide present in the surface side of the active material particle was identified to have a layered crystal structure of an R3m space group (C).

Experimental Example 3: Evaluation of Positive Electrode Active Material

A coin cell (using a Li metal negative electrode) was manufactured using the positive electrode active material prepared in Preparation Example 1, and was charged and discharged under the conditions of room temperature (25° C.) and 0.1 C/0.1 C. Then, initial charge and discharge properties were evaluated, and the results are shown in FIG. 2.

Figure 2:
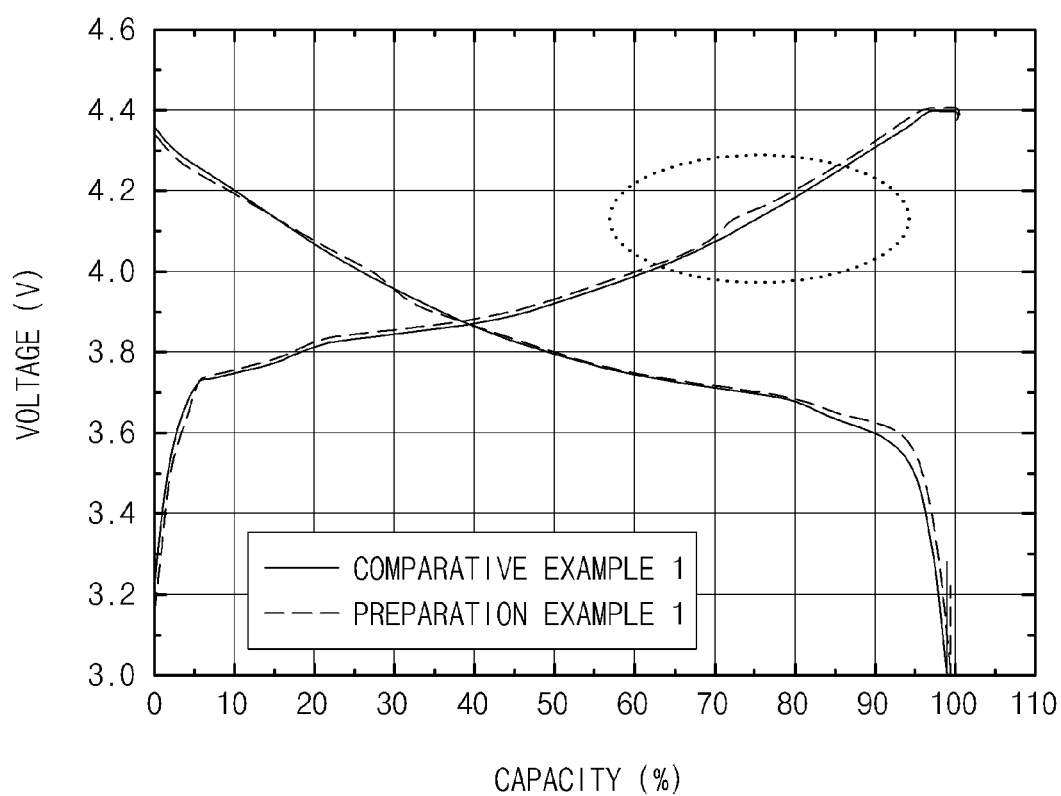
FIG. 2 is a graph illustrating initial charge and discharge properties during charging and discharging for lithium secondary batteries including each positive electrode active materials prepared in Preparation Example 1 and Comparative Example 1.

From the experimental results, as shown in FIG. 2, a lithium secondary battery including the positive electrode active material of Preparation Example 1, having a lithium deficient structure in the inner part of the lithium cobalt oxide particle, illustrated almost equal degree of charge and discharge properties as a lithium secondary battery including a positive electrode material of $LiCoO_2$ without a lithium deficient structure. However, the bending of a voltage profile was observed between 4.05 V to 4.15 V during initial charging and discharging due to the lithium deficient structure present in the inner part of a particle for the positive electrode active material of Preparation Example 1.

Additionally, a coin cell (using a Li metal negative electrode) was manufactured using the positive electrode active material prepared in Preparation Example 1, and was charged and discharged under the conditions of room temperature (25° C.) and each of 0.1 C and 0.5 C. Then, rate characteristic was evaluated. The results are shown in FIG. 3.

Figure 3:
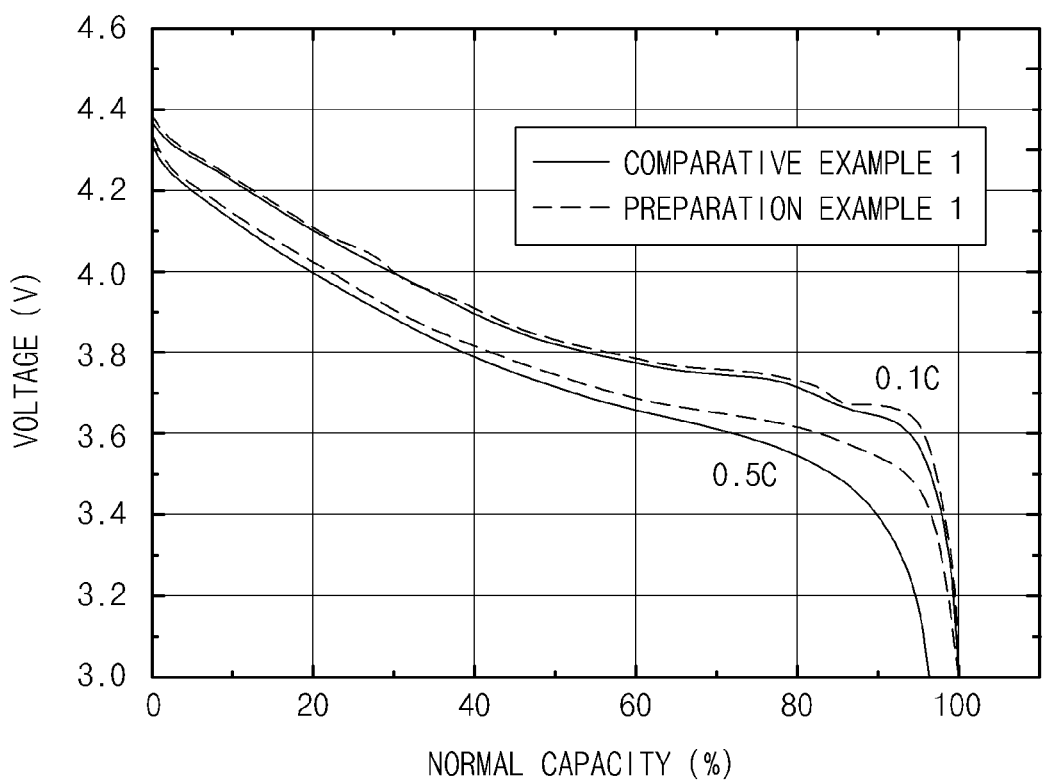
FIG. 3 is a graph illustrating rate properties during charging and discharging for lithium secondary batteries including each positive electrode active materials prepared in Preparation Example 1 and Comparative Example 1.

From the experimental results, as shown in FIG. 3, a lithium secondary battery including the positive electrode active material of Preparation Example 1, having a lithium deficient structure in the inner part of the lithium cobalt oxide particle had improved rate characteristic when compared to a lithium secondary battery including the positive electrode active material of $LiCoO_2$ without a lithium deficient structure.

Experimental Example 4: Evaluation of Battery Properties of Lithium Secondary Battery The battery properties of the lithium secondary batteries manufactured in Example 1 and Comparative Example 1 were evaluated by the following method.

In detail, for the lithium secondary batteries manufactured in Example 1 and Comparative Example 1, rate characteristic during charging and discharging was measured under the conditions of room temperature (25° C.) within a driving voltage from 3 V to 4.4 V with 2 C/0.1 C, and cycle capacity retention that was the ratio of a discharge capacity at $50^{th}$ cycle with respect to an initial capacity, was measured after charging and discharging for 50 cycles under the conditions of high temperature (60° C.) in a driving voltage range from 3 V to 4.4 V with 0.5 C/1 C. The results are shown in the following Table 2.

TABLE 2

|  | Rate characteristic (2 C/0.1 C, %) at room temperature (25° C.) | $50^{th}$ cycle capacity retention (%) at high temperature (60° C.) |
| --- | --- | --- |
| Comparative Example 1 | 91.5 | 94.4 |
| Example 1 | 97.1 | 96.2 |

From the experimental results, the battery of Example 1 including the positive electrode active material having a lithium deficient structure in the particle showed improved rate characteristic and life property when compared to the battery of Comparative Example 1 including the lithium cobalt oxide without the lithium deficient structure as the positive electrode active material.

The invention claimed is:

1. A positive electrode active material for a lithium secondary battery, comprising:
    lithium cobalt oxide particles,
    wherein the lithium cobalt oxide particles have a core-shell structure comprising a core part and a shell part,
    wherein the core part comprises a first lithium cobalt oxide of the following Formula 1,
    wherein the first lithium cobalt oxide is a lithium deficient lithium cobalt oxide having a Li/Co molar ratio of less than 1, and
    wherein the shell part is provided on a surface of the core part and comprises a second lithium cobalt oxide of the following Formula 2:

$$Li_{1-a}CoM_xO_2 \quad [Formula\ 1]$$

$$Li_bCoM'_yO_2 \quad [Formula\ 2]$$

in Formula 1 and 2, M and M' each independently comprises at least one metal element selected from the group consisting of W, Mo, Zr, Ti, Mg, Ta, Al, Fe, V, Cr, Ba, Ca, and Nb, and a, b, x, and y satisfy the following relations of $0<a\le0.05$, $1\le b\le1.2$, $0\le x\le0.02$, and $0\le y\le0.02$.

2. The positive electrode active material for a lithium secondary battery of claim 1, wherein the first lithium cobalt oxide belongs to an Fd-3m space group and has a cubic crystal structure.

3. The positive electrode active material for a lithium secondary battery of claim 1, wherein
    the first lithium cobalt oxide belongs to an Fd-3m space group and has a cubic crystal structure, and
    the second lithium cobalt oxide has a layered crystal structure.

4. The positive electrode active material for a lithium secondary battery of claim 1, wherein the core part is a region corresponding to a distance from 0% to 99% with respect to a distance from the core part to the surface of the lithium cobalt oxide particles.

5. The positive electrode active material for a lithium secondary battery of claim 1, wherein the core part and the shell part has a thickness ratio from 1:0.01 to 1:0.1.

6. The positive electrode active material for a lithium secondary battery of claim 1, wherein the core part and the shell part each independently comprises lithium distributed with decreasing concentration gradient toward the center of the lithium cobalt oxide particles.

7. The positive electrode active material for a lithium secondary battery of claim 1, wherein a lithium concentration gradient slope in the core part and a lithium concentration gradient slope in the shell part have the same or different slope values.

8. The positive electrode active material for a lithium secondary battery of claim 1, wherein at least one of the core part and the shell part comprises one concentration value of lithium in each corresponding region.

9. The positive electrode active material for a lithium secondary battery of claim 1, wherein lithium is distributed with a gradually decreasing concentration gradient from the surface to the center of the lithium cobalt oxide particles, and
    in Formula 1 and 2, a is increasing toward the center of the lithium cobalt oxide particles within a range of $0<a\le0.05$, and b is decreasing toward the center of the lithium cobalt oxide particles within a range of $1\le b\le1.2$.

10. The positive electrode active material for a lithium secondary battery of claim 1, comprising a monolith structure with the lithium cobalt oxide particles having an average particle diameter from 3 to 50 μm.

11. The positive electrode active material for a lithium secondary battery of claim 1, having an inflection point is-within a voltage range from 4.0 V to 4.2 V when measuring a voltage profile according to charging and discharging.

12. A method of preparing the positive electrode active material for a lithium secondary battery according to claim 1, the method comprising:
    mixing a cobalt raw material and a lithium raw material in amounts satisfying a relation of $0<Li/Co$ molar ratio$<1$ to prepare a first mixture;

heating the first mixture to prepare particles of the first lithium cobalt oxide;

mixing the particles of the first lithium cobalt oxide with amounts of a cobalt raw material and a lithium raw material satisfying a relation of 1≤Li/Co molar ratio to prepare a second mixture; and heating the second mixture at a temperature ranging from 800° C. to 1,100° C. to prepare the lithium cobalt oxide particles.

13. The method of preparing the positive electrode active material for a lithium secondary battery of claim 12, wherein, during preparation of the first mixture, further comprising:

mixing a raw material with the cobalt raw material and the lithium raw material to prepare the first mixture, wherein the raw material comprising at least one metal element selected from the group consisting of W, Mo, Zr, Ti, Mg, Ta, Al, Fe, V, Cr, Ba, Ca, and Nb.

14. The method of preparing the positive electrode active material for a lithium secondary battery of claim 12, wherein, during preparation of the first mixture, the cobalt raw material and the lithium raw material are mixed in amounts satisfying a relation of 0.95≤Li/Co molar ratio<1, and wherein the first mixture is heated at a temperature ranging from 800° C. to 1,100° C.

15. The method of preparing the positive electrode active material for a lithium secondary battery of claim 12, wherein the second mixture is heated at a temperature ranging from 1,000° C. to 1,100° C.

16. The method of preparing the positive electrode active material for a lithium secondary battery of claim 12, wherein, during preparation of the second mixture, further comprising:

mixing a raw material with the cobalt raw material, the lithium raw material, and the particles of the first lithium oxide to prepare the second mixture, wherein the raw material including at least one metal element selected from the group consisting of W, Mo, Zr, Ti, Mg, Ta, Al, Fe, V, Cr, Ba, Ca, and Nb.

17. A positive electrode for a lithium secondary battery, the positive electrode comprising the positive electrode active material according to claim 1.

18. A lithium secondary battery comprising the positive electrode according to claim 17.

* * * * *